(12) United States Patent
Ohtsu

(10) Patent No.: US 6,865,470 B2
(45) Date of Patent: Mar. 8, 2005

(54) TRACTION DISTRIBUTION CONTROL SYSTEM FOR FOUR-WHEEL DRIVE VEHICLE

(75) Inventor: Nobuyuki Ohtsu, Kanagawa (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/360,809

(22) Filed: Feb. 10, 2003

(65) Prior Publication Data

US 2003/0154013 A1 Aug. 14, 2003

(30) Foreign Application Priority Data

Feb. 12, 2002 (JP) ......................................... 2002-034414

(51) Int. Cl.$^7$ ............................. G06F 7/70; G06G 7/76
(52) U.S. Cl. ............................. 701/89; 701/75; 701/90; 180/197; 180/248; 303/143
(58) Field of Search ............................. 701/70–71, 91, 701/74–75, 81–84, 88–90, 72; 303/149, 158, 171–173, 113.2, 139–144; 180/197, 233, 247–249

(56) References Cited

U.S. PATENT DOCUMENTS

| | | | | |
|---|---|---|---|---|
| 5,004,064 A | * | 4/1991 | Tezuka et al. | 180/197 |
| 5,168,955 A | * | 12/1992 | Naito | 180/197 |
| 5,367,461 A | * | 11/1994 | Matsuda et al. | 701/91 |
| 5,459,661 A | * | 10/1995 | Yagi et al. | 701/85 |
| 5,461,568 A | | 10/1995 | Morita | 701/88 |
| 5,497,333 A | * | 3/1996 | Sasaki | 701/72 |
| 5,555,499 A | * | 9/1996 | Yamashita et al. | 701/84 |
| 5,765,657 A | * | 6/1998 | Fukumura et al. | 180/197 |
| 5,927,425 A | * | 7/1999 | Kusano | 180/248 |
| 2003/0150660 A1 | * | 8/2003 | Ohtsu | 180/197 |

* cited by examiner

Primary Examiner—Jacques H. Louis-Jacques
(74) Attorney, Agent, or Firm—Foley & Lardner LLP

(57) ABSTRACT

A traction distribution control system for a 4WD vehicle is constructed to calculate a difference gain in accordance with a difference in spinning state between main driving wheels, and determine a control signal for controlling traction distribution to driven wheels by multiplying a control amount by the difference gain.

21 Claims, 6 Drawing Sheets

TRACTION DISTRIBUTION CONTROL SYSTEM FOR FOUR-WHEEL DRIVE VEHICLE

BACKGROUND OF THE INVENTION

The present invention relates to a traction distribution control system for a four-wheel drive (4WD) vehicle, which distributes traction of a power source to a pair of main driving wheels or one of pairs of front wheels and rear wheels and a pair of driven wheels or another pair of wheels.

Typically, a traction distribution control system for a 4WD vehicle comprises engaging means arranged in a path transferring power of an engine to the main driving wheels and for transferring power to the driven wheels when the engaging means are in engagement, wherein the engagement state of the engaging means is controlled to control traction distribution to the driven wheels.

This traction distribution control system is constructed such that a difference is obtained between an average speed of the front wheels and an average speed of the rear wheels, wherein as the difference is greater, engaging force of the engaging means is increased to enhance the ratio of traction distribution to the driven wheels, and wherein as the difference is smaller, engaging force of the engaging means is decreased to lower the ratio of traction distribution to the driven wheels. Therefore, when torque slip occurs in the main driving wheels, the ratio of traction distribution to the driven wheels is increased to enhance the vehicle running-ability and stability while reducing torque slip of the main driving wheel.

With the above traction distribution control system, the average speeds of the front wheels and the rear wheels are obtained, respectively, to determine the ratio of traction distribution to the driven wheels, i.e. engaging force of the engaging means, in accordance with a difference between the average speeds. Thus, when the vehicle runs on a road having different road-surface friction coefficients (hereafter refer to friction coefficient as "$\mu$") for right and left wheels, i.e. a split-$\mu$ road, for example, and when one of the main driving wheels is on the low $\mu$ road surface and causes a slip, but another main driving wheel does not cause a slip, an average speed of the right and left wheels, which serves as a reference for control, has slower increase than the speed of the slip wheel, and less increasing amount. As a result, the ratio of traction distribution to the driven wheels determined in accordance with a difference between the average speed of the front wheels and the average speed of the rear wheels becomes smaller than an optimum value for stable vehicle running with slip of the main driving wheel restrained. This renders not only slipping of the main driving wheel uncontrollable, but also enhancement in vehicle start-ability and stability difficult.

Moreover, the above problem due to slipping of only one of the main driving wheels can occur not only when the vehicle runs on the split-$\mu$ road, but also when the cornering inner wheel has smaller load during cornering.

SUMMARY OF THE INVENTION

It is, therefore, an object of the present invention to provide a traction distribution control system for a 4WD vehicle, which contributes to earlier convergence of slip of the main driving wheels, and enhancement in the vehicle start-ability, stability and the like.

The present invention provides generally a four-wheel drive vehicle, which comprises: a source of traction; a device which transfers traction; main driving wheels which receive traction from the source; driven wheels which form at least a state of receiving smaller traction than traction transmitted to the main driving wheels through the device, the driven wheels receiving traction which can be changed through the device; and an ECU which controls distribution of traction to the driven wheels, wherein the ECU is so programmed as to: form a control signal for operating the device in accordance with an input signal, calculate a difference in spinning state between the main driving wheels, and determine the control signal in accordance with the difference.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
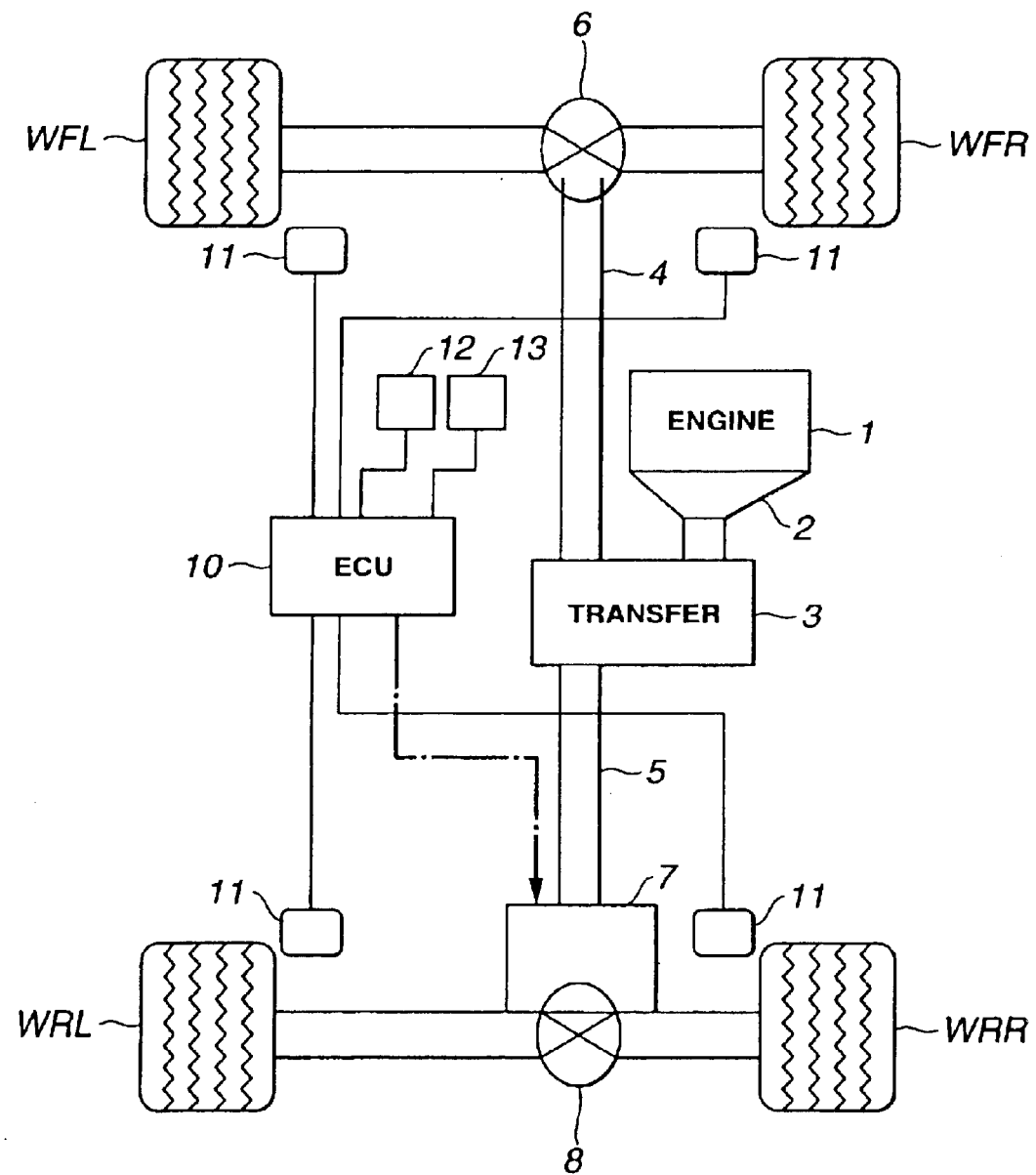
FIG. 1 is a block diagram showing a traction distribution control system for a 4WD vehicle, to which the present invention is applied.

Referring to the drawings, a description is made about a traction distribution control system for a 4WD vehicle embodying the present invention.

Referring to FIG. 1, the 4WD vehicle to which the present invention is applied is a front-drive vehicle having front wheels as main driving wheels and rear wheels as driven wheels. Traction of an engine 1 is transmitted to a transfer 3 through an automatic transmission 2 having a torque converter, which is distributed to a front propeller shaft 4 and a rear propeller shaft 5 by transfer 3. Traction transmitted to front propeller shaft 4 is always transferred to front wheels WFR, WFL through a front differential 6, whereas traction transmitted to rear propeller shaft 5 is transferred to rear wheels WRR, WRL through a clutch or traction transfer means 7 and a rear differential 8.

Thus, in the state that clutch 7 is in full disengagement, the ratio of traction distribution between front wheels WFR, WFL and rear wheels WRR, WRL is 100:0, whereas in the state that cutch 7 is in full engagement, the ratio is 50:50. Therefore, by changing the engaging state of clutch 7, traction distribution between wheels WFR, WFL and rear wheels WRR, WRL can arbitrarily be changed in the range of 100:0 to 50:50.

The engaging state of clutch 7 is changed in accordance with the magnitude of a control output current I derived from an electronic control unit (ECU) or traction distribution control means 10. ECU 10 is connected to wheel-speed sensors 11 for sensing speeds Vw of wheels WFR, WFL WRR, WRL When required, ECU 10 may be connected to a longitudinal acceleration sensor 12 for sensing longitudinal acceleration of the vehicle and a lateral acceleration sensor 13 for sensing lateral acceleration of the vehicle. Sensors 11–13 can serve as sensors arranged in an ABS control system for preventing wheel lock during braking.

Figure 2:
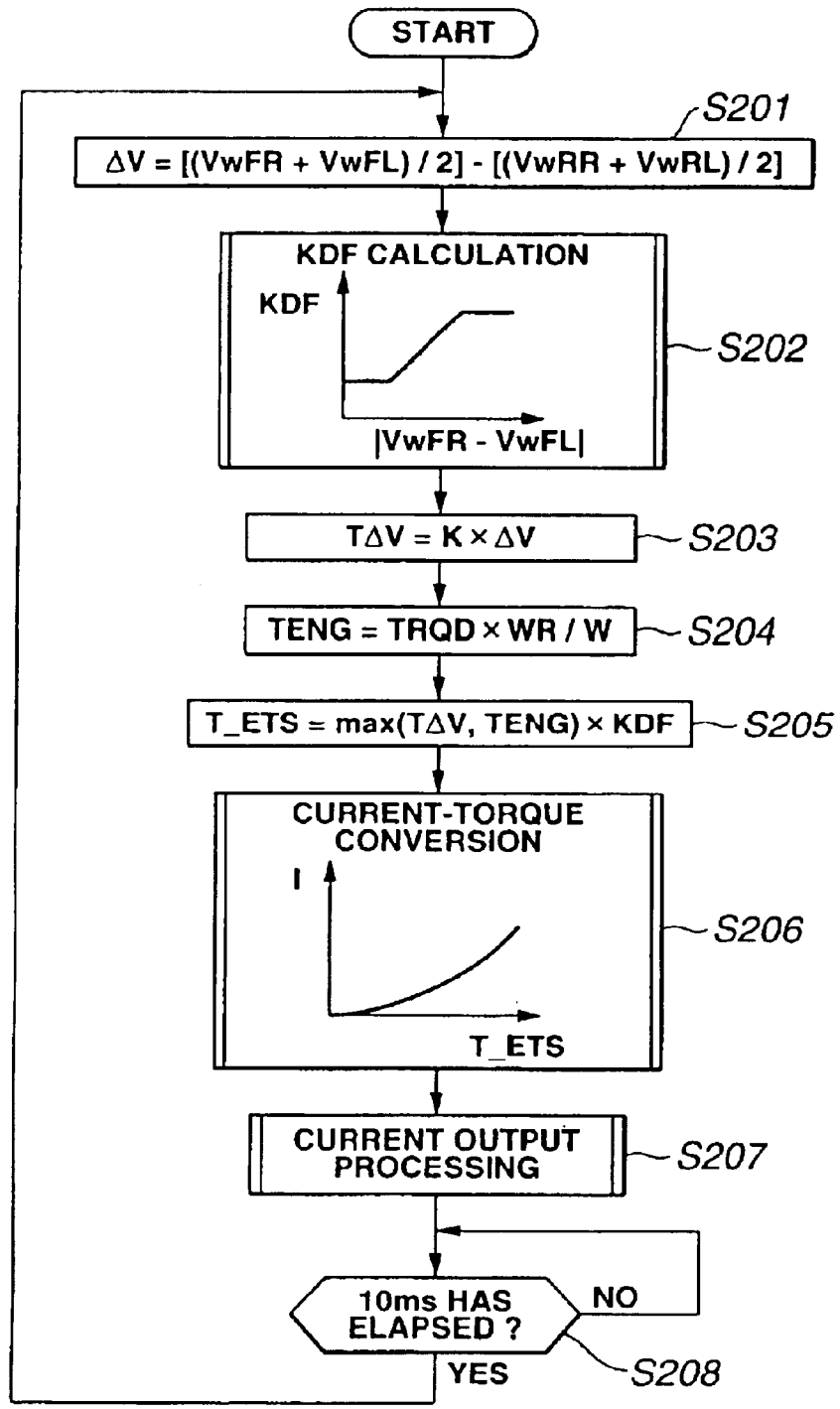
FIG. 2 is a flowchart showing the operation of a first embodiment of the present invention.

Referring to FIG. 2, traction distribution control carried out by ECU 10 is described. At a step S201, a speed difference $\Delta V$ between front and rear wheels is obtained. Wheel-speed difference $\Delta V$ is obtained by subtracting an average speed of rear wheels WRR, WRL from an average speed of front wheels WFR, WFL such that:

$$\Delta V = \{(VwFR+VwFL)/2\} - \{(VwRR+VwRL)/2\}$$

Figure 3:
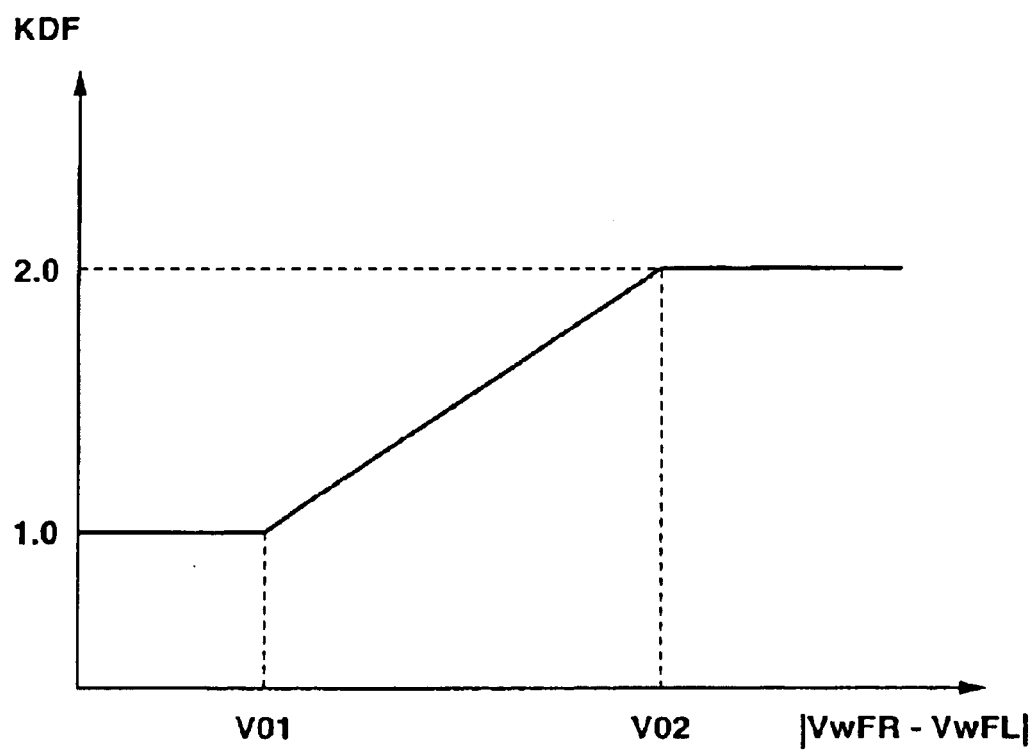
FIG. 3 is a map illustrating a difference gain characteristic.

At a step S202, a difference gain KDF is calculated. In the first embodiment, difference gain KDF is calculated in accordance with a KDF characteristic map corresponding to a predetermined speed difference between front right and left wheels WFR, WFL, i.e. $|VwFR-VwFL|$. Referring to FIG. 3, in this map, when the speed difference is smaller than a predetermined value V01, KDF=1.0. When the speed difference is larger than a predetermined value V02, KDF=2.0. And between predetermined values V01 and V02, KDF increases proportionally from 1.0 to 2.0 in accordance with a value of the speed difference.

At a step S203, a wheel-rpm difference control amount or first control amount $T\Delta V$ is calculated by $T\Delta V=k\times\Delta V$, where k is a constant. Wheel-rpm difference control amount $T\Delta V$ corresponds to engaging force of clutch 7 in accordance with wheel-speed difference $\Delta V$, and also to traction to be distributed to rear wheels WRR, WRL At a step S204, a driving-torque distribution control amount or second control amount TENG, which is an appropriate traction distribution amount to rear wheels WRR, WRL in response to engine output torque of engine 1, is obtained by TENG=TROD×(WR/W), where TROD is torque of an output shaft of the toque converter of automatic transmission 2, and can be obtained from the engine speed. When rear wheels WRR, WRL serve as main driving wheels to achieve traction distribution to front wheels WFR, WFL as driven wheels, TROD is multiplied by WF/W corresponding to a load of front wheels WFR, WFL.

At a step S205, a control-torque calculated value T_ETS is obtained, which corresponds to optimum torque to be transmitted from clutch 7 to rear wheels WRR, WRL Control-torque calculated value T_ETS is obtained by multiplying greater one of wheel-rpm difference control amount $T\Delta V$ calculated at step S203 and driving-torque distribution control amount TENG calculated at step S204 by difference gain KDF.

At a step S206, control output current I is obtained in accordance with a current-torque conversion characteristic preprogrammed in response to control-torque calculated value T_ETS. At a step S207, processing is carried out to provide control output current I to clutch 7. And a step S208, it is determined whether or not 10 ms has elapsed, which is a control cycle of this control flow. If it is determined that 10 ms has elapsed, flow is returned to step S201.

Referring to FIGS. 4A–4F, examples of operation of the first embodiment are described. Referring to FIG. 5, those examples are taken when the vehicle starts from a standstill on a splits road having highs for right wheels WFR, WRR and low-p for left wheels WFL, WRL, and front left wheel WFL turns free. Specifically, FIGS. 4A–4F show a change in speed VwFL of front left wheel WFL from a beginning of free turning with respect to speeds VwFR, VwRR, VwRL of the other three wheels which are substantially equal to a vehicle-body speed V to a convergence thereof.

Figure 4A:
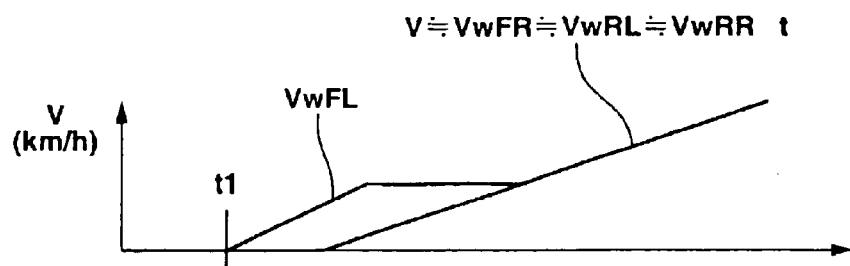
FIGS. 4A–4F are time charts illustrating examples of operation of the first embodiment.
Figure 4B:
Figure 4C:
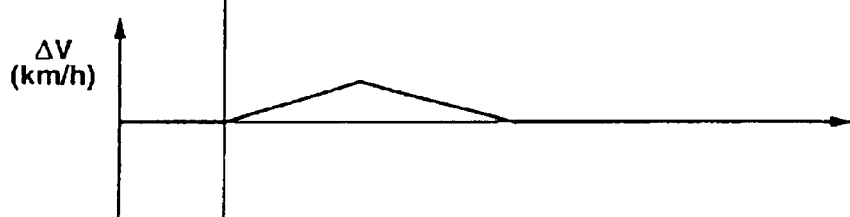
Figure 4D:
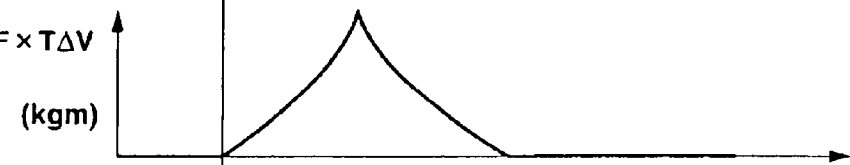

The examples as shown in FIGS. 4A–4F are described in order. Referring to FIG. 4A, free turning of front left wheel WFL starts at point "t1", so that only its wheel speed VwFL becomes greater than the speeds of the other three wheels. In response to this free turning, at step S201 in FIG. 2, wheel-speed difference $\Delta V$ is produced as a positive value, and varies as shown in FIG. 4C. Due to wheel-speed difference $\Delta V$ produced in such a way, at step S202 in FIG. 2, difference gain KDF is formed having a value greater than 1.0, which is produced as shown in FIG. 4B. Therefore, a value obtained by multiplying wheel-rpm difference control amount or first control amount $T\Delta V$ obtained in accordance with wheel-speed difference $\Delta V$ at step S203 by difference gain KDF varies as shown in FIG. 4D. FIG. 4D shows an optimum control amount determined in accordance with wheel-speed difference $\Delta V$.

Figure 4E:
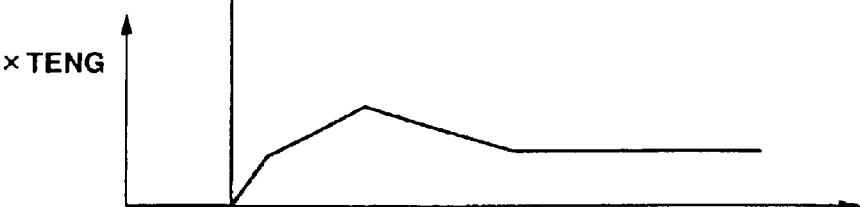
Figure 4F:
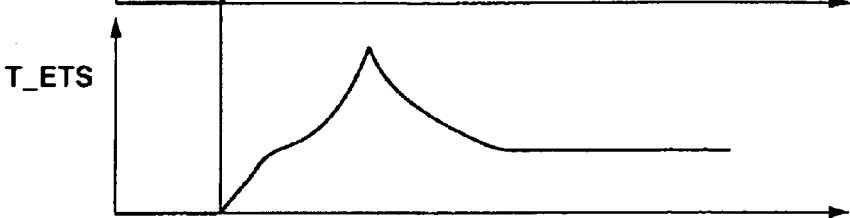
Figure 5:
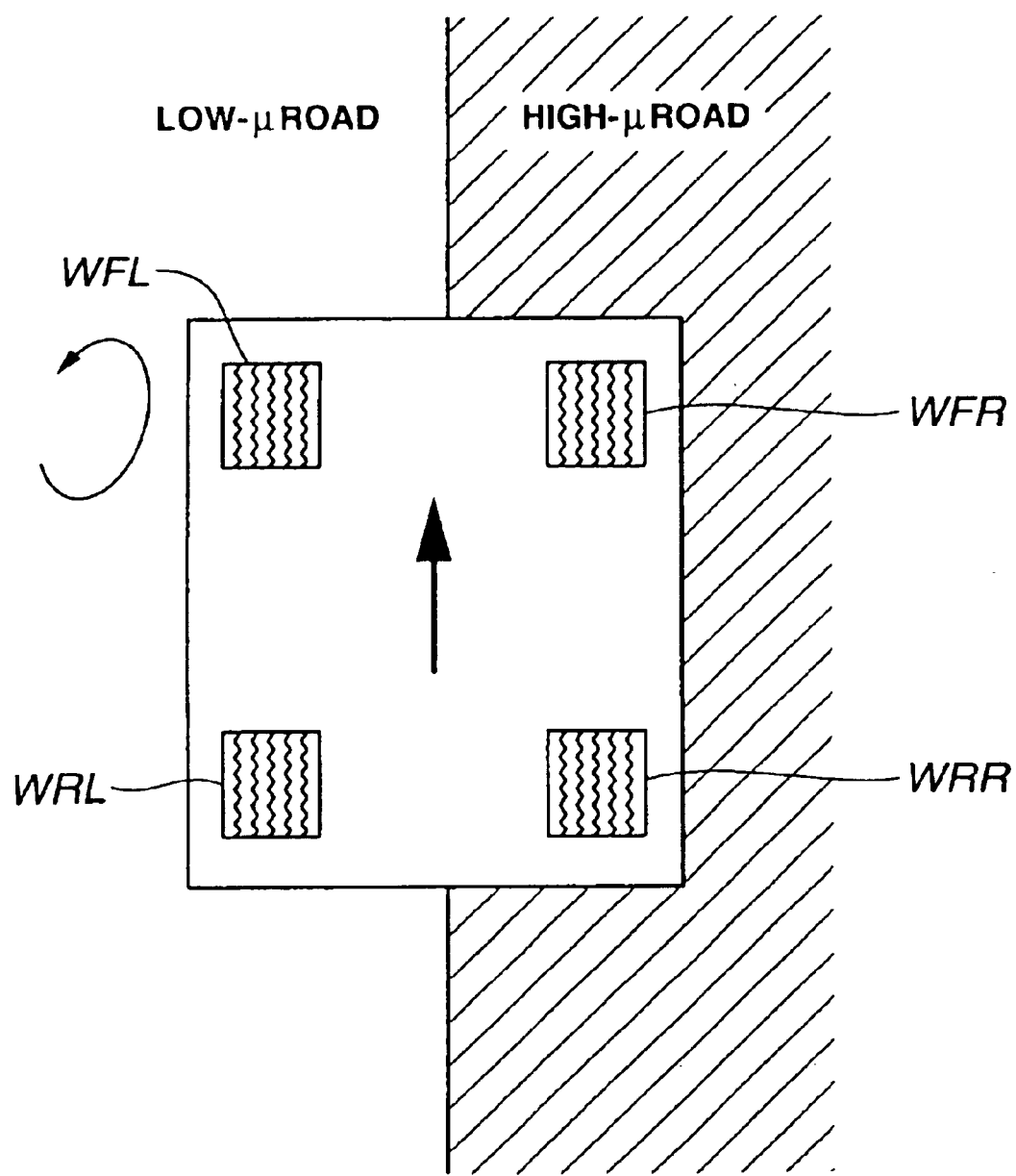
FIG. 5 is a diagrammatic view showing a splits road on which the front left wheel of the vehicle turns free.

At step S204 in FIG. 2, driving-torque distribution control amount or second control amount TENG is calculated in accordance with the output state of engine 1 resulting from the starting operation. A value obtained by multiplying driving-torque distribution control amount TENG by difference gain KDF is produced as shown in FIG. 4E. Since this value corresponds to the driving state of engine 1, it can rise immediately before beginning of free turning of the wheel. FIG. 3E shows an optimum control amount determined in accordance with engine output torque. Then, control-torque calculated value T_ETS obtained at step S205 is as shown in FIG. 4F.

ECU 10 provides control output current I in accordance with control-torque calculated value T_ETS. In the first embodiment, as compared with a variation in wheel-speed difference $\Delta V$ which serves as a base of formation of control output current I in the prior art, control output current I of a higher value is formed in a feedforward-control way in accordance with an increase in engine output torque immediately after point "t1". With this, traction distribution at a greater ratio is carried out to driven wheels WRR, WRL at an early stage, making free turning of front left wheel WFL trend to convergence. Then, with an increase in difference gain KDF, control output current I is formed having a higher value obtained by multiplying further by difference gain KDF the feedback-control-like first control amount obtained by multiplying wheel-speed difference $\Delta V$ by constant k. With this, traction distribution at a greater ratio is also carried out to driven wheels WRR, WRL at an early stage, making free turning of front left wheel WFL trend to convergence. This leads to free turning of front left wheel WFL in a short time.

In such a way, in the first embodiment, even if wheel spin occurs at one of front wheels WFR, WFL as main driving wheels, difference gain KDF corresponding appropriately to the wheel-spin amount is formed to generate appropriate engaging torque in clutch 7, transmitting traction to rear wheels WRR, WRL as driven wheels, thus allowing enhancement in vehicle start-ability and stability. Moreover, difference gain KDF corresponding appropriately to the wheel-spin amount is formed to generate appropriate engaging torque in clutch 7, so that even if wheel spin occurs at a cornering inner wheel during cornering and cornering acceleration, appropriate traction distribution is carried out to rear wheels WRR, WRL as drive wheels, thus allowing enhancement in vehicle stability.

Figure 6:
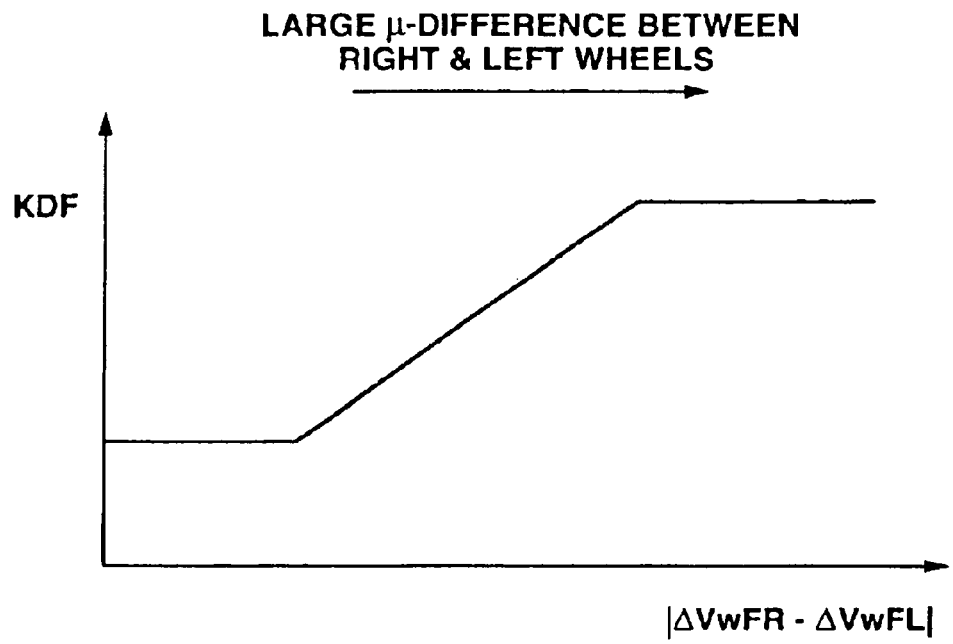
FIG. 6 is a map similar to FIG. 3, showing a second embodiment of the present invention.

Referring to FIG. 6, the second embodiment of the present invention is described, which is substantially the same as the first embodiment except the method of calculating difference gain KDF at step S202 shown in FIG. 2. In the second embodiment, difference gain KDF is formed in accordance with a difference between accelerations ΔVwFR, ΔVwFL of front wheels WFR, WFL as main driving wheels. The second embodiment allows enhancement in sensibility with respect to a difference in road-surface friction coefficient between the right and left wheels.

Figure 7:
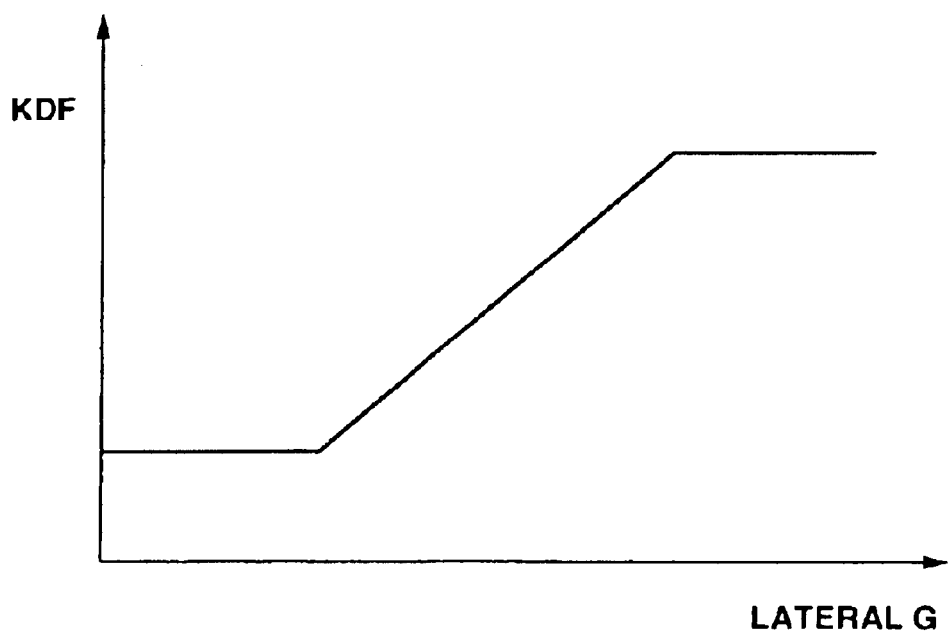
FIG. 7 is a map similar to FIG. 6, showing a third embodiment of the present invention.

Referring to FIG. 7, the third embodiment of the present invention is described, which is substantially the same as the first embodiment except the method of calculating difference gain KDF at step S202 shown in FIG. 2. In the third embodiment, difference gain KDF is formed in accordance with a lateral acceleration YG generated in the vehicle. The third embodiment allows appropriate setting of traction distribution to rear wheels ERR, WRL in accordance with a load difference between front wheels WFR, WFL. In place of being detected by lateral acceleration sensor 13 as shown in FIG. 1, lateral acceleration YG can be calculated in accordance with wheel speed Vw such that:

$$YG=(4p^2/9.807) \times r \times V^2$$

wherein r is a cornering radius, which can be obtained by:
r=(tread×inner-wheel Vw)/(outer-wheel Vw−inner-wheel Vw).

Having described the present invention with regard to the illustrative embodiments, it is noted that the present invention is not limited thereto, and various changes and modifications can be made without departing from the scope of the present invention. By way of example, the present invention is applied to a vehicle having front wheels as main driving wheels, alternatively, it can be applied to a vehicle having rear wheels as main driving wheels. Further, in the illustrative embodiments, the traction transfer means include clutch 7 for transmitting to the driven wheels traction taken from the traction transfer path to the main driving wheels. Optionally, separate and distinct driving sources may be used for the main driving wheels and the driven wheels to transmit tractions thereto independently. Specifically, the main driving wheels can be driven by main driving means, whereas the driven wheels can be driven by auxiliary driving means. In this variation, therefore, the traction transfer means are not limited to clutch 7, but may include auxiliary driving means and means for transmitting traction from the auxiliary driving means to the driven wheels. Alternatively, the traction transfer means may include a clutch arranged in the power transfer path between the auxiliary driving means and the driven wheels.

Furthermore, in the illustrative embodiments, the power source includes engine 1, alternatively, it may include a motor, for example. Further, in the illustrative embodiments, two control amounts are formed: control amount (TΔV) based on an average-speed difference between the front and rear wheels and control amount (TENG) based on engine output torque. Optionally, one of the two control amounts may be formed. The control amount based on engine output torque may be determined by other input such as accelerator opening. Still further, in the illustrative embodiments, traction distribution between front wheels WFR, WFL and rear wheels WRR, WRL is carried out in the range of 100:0 to 50:50, alternatively, it can be changed in a narrower range.

The entire contents of Japanese Patent Application P2002-034413 filed Feb. 12, 2002 are hereby incorporated by reference.

What is claimed is:

1. A four-wheel drive vehicle, comprising:
a source of traction;
a main path which serves to transfer traction;
an auxiliary path branched from the main path, the auxiliary path serving to transfer traction;
main driving wheels which receive traction from the source through the main path;
driven wheels which receive traction through the auxiliary path;
a clutch arranged in the auxiliary path, the clutch changing traction to be transferred to the driven wheels through a change in engaging force;
a device which detects a speed of a vehicle body;
a device which detects speeds of the respective wheels; and
an ECU which provides to the clutch a control signal for carrying out the change in engaging force, the ECU being se programmed so as to:
calculate a control threshold value in accordance with the detected vehicle-body speed,
carry out a traction distribution control to increase distribution of traction to the driven wheels when a difference in detected wheel speeds between the main driving wheels and the driven wheels exceeds the control threshold value,
detect a constant-speed run of the vehicle, and
carry out a correction control to correct the control threshold value in accordance with the detected vehicle-body speed and the difference in detected wheel speeds when the constant-speed run is detected.

2. The four-wheel drive vehicle as claimed in claim 1, wherein a result of the correction control is stored in a storage until a next correction control is carried out.

3. The four-wheel drive vehicle as claimed in claim 1, wherein the correction control is carried out such that:
when a rate of an absolute value of the difference in detected wheel speeds to the vehicle-body speed is larger, it is determined that a difference in diameter between the main driving wheels and the driven wheels is greater, and then the control threshold value is increased gradually; and
when the rate of the absolute value of the difference to the vehicle-body speed is smaller, it is determined that the difference in diameter is smaller, and then the control threshold value is decreased gradually.

4. The four-wheel drive vehicle as claimed in claim 1, wherein the control threshold value is calculated such that the vehicle-body speed is multiplied by an offset gain, and then divided by another vehicle-body speed upon calculation of the offset gain.

5. The four-wheel drive vehicle as claimed in claim 4, wherein the correction control is carried out by setting the offset gain in accordance with a relationship between the difference in detected wheel speeds and the vehicle-body speed, wherein the control threshold value is increased gradually by increasing gradually the offset gain or is decreased gradually by decreasing gradually the offset gain depending upon the relationship.

6. The four-wheel drive vehicle as claimed in claim 1, wherein the traction distribution control is carried out by determining the engaging force of the clutch in accordance with a difference between the difference in detected wheel speeds and the control threshold value.

7. A four-wheel drive vehicle, comprising:
a source of traction;
a main path which serves to transfer traction;
an auxiliary path branched from the main path, the auxiliary path serving to transfer traction;
main driving wheels which receive traction from the source through the main path;

driven wheels which receive traction through the auxiliary path;

a clutch arranged in the auxiliary path, the clutch changing traction to be transferred to the driven wheels through a change in engaging force;

means for detecting a speed of a vehicle body;

means for detecting speeds of the respective wheels; and means for providing to the clutch a control signal for carrying out the change in engaging force, the providing means comprising:

means for calculating a control threshold value in accordance with the detected vehicle-body speed, means for carrying out a traction distribution control to increase distribution of traction to the driven wheels when a difference in detected wheel speeds between the main driving wheels and the driven wheels exceeds the control threshold value, means for detecting a constant-speed run of the vehicle, and means for carrying out a correction control to correct the control threshold value in accordance with the detected vehicle-body speed and the difference in detected wheel speeds when the constant-speed run is detected.

8. The four-wheel drive vehicle as claimed in claim 7, wherein a result of the correction control is stored in a storage until a next correction control is carried out.

9. The four-wheel drive vehicle as claimed in claim 7, wherein the correction control is carried out such that:

when a rate of an absolute value of the difference in detected wheel speeds to the vehicle-body speed is larger, it is determined that a difference in diameter between the main driving wheels and the driven wheels is greater, and then the control threshold value is increased gradually; and when the rate of the absolute value of the difference to the vehicle-body speed is smaller, it is determined that the difference in diameter is smaller, and then the control threshold value is decreased gradually.

10. The four-wheel drive vehicle as claimed in claim 7, wherein the control threshold value is calculated such that the vehicle-body speed is multiplied by an offset gain, and then divided by another vehicle-body speed upon calculation of the offset gain.

11. The four-wheel drive vehicle as claimed in claim 10, wherein the correction control is carried out by setting the offset gain in accordance with a relationship between the difference in detected wheel speeds and the vehicle-body speed, wherein the control threshold value is increased gradually by increasing gradually the offset gain, or is decreased gradually by decreasing gradually the offset gain depending upon the relationship.

12. The four-wheel drive vehicle as claimed in claim 7, wherein the traction distribution control is carried out by determining the engaging force of the clutch in accordance with a difference between the difference in detected wheel speeds and the control threshold value.

13. A method of controlling traction distribution in a four-wheel drive vehicle with a traction source, main driving wheels, driven wheels, and a clutch, the method comprising:

detecting a speed of a vehicle body;

detecting speeds of the respective wheels;

providing to the clutch a control signal for carrying out the change in engaging force;

calculating a control threshold value in accordance with the detected vehicle-body speed;

carrying out a traction distribution control to increase distribution of traction to the driven wheels when a difference in detected wheel speeds between the main driving wheels and the driven wheels exceeds the control threshold value;

detecting a constant-speed run of the vehicle; and carrying out a correction control to correct the control threshold value in accordance the detected vehicle-body speed and with the difference in detected wheel speeds when the constant-speed run is detected.

14. The method as claimed in claim 13, wherein a result of the correction control is stored in a storage until a next correction control is carried out.

15. The method as claimed in claim 14, wherein the correction control is carried out such that:

when a rate of an absolute value of the difference in detected wheel speeds to the vehicle-body speed is larger, it is determined that a difference in diameter between the main driving wheels and the driven wheels is greater, and then the control threshold value is increased gradually; and when the rate of the absolute value of the difference to the vehicle-body speed is smaller, it is determined that the difference in diameter is smaller, and then the control threshold value is decreased gradually.

16. The method as claimed in claim 14, wherein the control threshold value is calculated such that the vehicle-body speed is multiplied by an offset gain, and then divided by another vehicle-body speed upon calculation of the offset gain.

17. The method as claimed in claim 16, wherein the correction control is carried out by setting the offset gain in accordance with a relationship between the difference in detected wheel speeds and the vehicle-body speed, wherein the control threshold value is increased gradually by increasing gradually the offset gain, or is decreased gradually by decreasing gradually the offset gain depending upon the relationship.

18. The method as claimed in claim 13, wherein the traction distribution control is carried out by determining the engaging force of the clutch in accordance with a difference between the difference in detected wheel speeds and the control threshold value.

19. A four-wheel drive vehicle, comprising:

a source of traction;

a main path which serves to transfer traction;

an auxiliary path branched from the main path, the auxiliary path serving to transfer traction;

main driving wheels which receive traction from the source through the main path;

driven wheels which receive traction through the auxiliary path;

a clutch arranged in the auxiliary path, the clutch changing traction to be transferred to the driven wheels through a change in engaging force;

a device which detects a speed of a vehicle body;

a device which detects speeds of the respective wheels; and an ECU which provides to the clutch a control signal for carrying out the change in engaging force, the ECU being programmed so as to:

calculate a control threshold value in accordance with the detected vehicle-body speed, carry out a traction distribution control to increase distribution of traction to the driven wheels when a difference in detected wheel speeds between the main driving wheels and the driven wheels exceeds the control threshold value, detect a constant-speed run of the vehicle, and carry out a correction control to correct the control threshold value in accordance with the difference in detected wheel speeds when the constant-speed run is detected, the correction control comprising:

determining, when a rate of an absolute value of the difference in detected wheel speeds to the vehicle-body speed is larger, that a difference in diameter between the main driving wheels and the driven wheels is greater, and then the control threshold value is increased gradually; and determining, when the rate of the absolute value of the difference to the vehicle-body speed is smaller, that the difference in diameter is smaller, and then the control threshold value is decreased gradually.

20. A four-wheel drive vehicle, comprising:

a source of traction;

a main path which serves to transfer traction;

an auxiliary path branched from the main path, the auxiliary path serving to transfer traction;

main driving wheels which receive traction from the source through the main path;

driven wheels which receive traction through the auxiliary path;

a clutch arranged in the auxiliary path, the clutch changing traction to be transferred to the driven wheels through a change in engaging force;

means for detecting a speed of a vehicle body;

means for detecting speeds of the respective wheels; and means for providing to the clutch a control signal for carrying out the change in engaging force, the providing means comprising:

means for calculating a control threshold value in accordance with the detected vehicle-body speed, means for carrying out a traction distribution control to increase distribution of traction to the driven wheels when a difference in detected wheel speeds between the main driving wheels and the driven wheels exceeds the control threshold value, means for detecting a constant-speed run of the vehicle, and means for carrying out a correction control to correct the control threshold value in accordance with the difference in detected wheel speeds when the constant-speed run is detected, the correction control comprising:

determining, when a rate of an absolute value of the difference in detected wheel speeds to the vehicle-body speed is larger, that a difference in diameter between the main driving wheels and the driven wheels is greater, and then the control threshold value is increased gradually; and determining, when the rate of the absolute value of the difference to the vehicle-body speed is smaller, that the difference in diameter is smaller, and then the control threshold value is decreased gradually.

21. A method of controlling traction distribution in a four-wheel drive vehicle with a traction source, main driving wheels, driven wheels, and a clutch, the method comprising:

detecting a speed of a vehicle body;

detecting speeds of the respective wheels;

providing to the clutch a control signal for carrying out the change in engaging force;

calculating a control threshold value in accordance with the detected vehicle-body speed;

carrying out a traction distribution control to increase distribution of traction to the driven wheels when a difference in detected wheel speeds between the main driving wheels and the driven wheels exceeds the control threshold value;

detecting a constant-speed run of the vehicle; and carrying out a correction control to correct the control threshold value in accordance with the difference in detected wheel speeds when the constant-speed run is detected, the correction control comprising:

determining, when a rate of an absolute value of the difference in detected wheel speeds to the vehicle-body speed is larger, that a difference in diameter between the main driving wheels and the driven wheels is greater, and then the control threshold value is increased gradually; and determining, when the rate of the absolute value of the difference to the vehicle-body speed is smaller, that the difference in diameter is smaller, and then the control threshold value is decreased gradually.

* * * * *